United States Patent [19]

LeBlond et al.

[11] Patent Number: 4,508,392

[45] Date of Patent: Apr. 2, 1985

[54] WHEEL HUB INCLUDING STRUCTURE FOR ATTACHMENT OF ACCESSORIES

[75] Inventors: Charles E. LeBlond; Henri LeBlond, both of St. Bruno, Canada

[73] Assignee: Hamelin Industries, Inc., Boucherville, Canada

[21] Appl. No.: 393,069

[22] Filed: Jun. 28, 1982

[51] Int. Cl.³ .................... B60B 3/06; B60B 5/02
[52] U.S. Cl. .................... 301/63 PW; 301/2.5; 301/6 V; 301/105 B
[58] Field of Search ............... 301/2.5, 5.7, 6 R, 6 D, 301/6 E, 6 V, 63 PW, 73, 105 R, 105 B; 308/190, 236; 384/428, 439

[56] References Cited

U.S. PATENT DOCUMENTS

| | | | |
|---|---|---|---|
| 992,713 | 5/1911 | Gilman | 308/190 |
| 2,083,188 | 6/1937 | Baldwin | 301/5.7 |
| 2,136,531 | 11/1938 | Vogt | 301/5.7 |
| 2,670,242 | 2/1954 | Beckman | 301/5.7 |
| 3,256,964 | 6/1966 | Dotter | 301/105 B X |
| 4,294,491 | 10/1981 | Black | 301/105 R X |
| 4,351,569 | 9/1982 | Steuer et al. | 301/6 V |
| 4,405,179 | 9/1983 | Boudreau | 301/63 PW X |

FOREIGN PATENT DOCUMENTS 1180939  6/1959  France ........................... 301/105 R Primary Examiner—David A. Scherbel
Attorney, Agent, or Firm—Trexler, Bushnell & Wolters, Ltd.

[57] ABSTRACT

A wheel hub is disclosed including an improved structure for mounting at least one accessory thereto. This structure includes a radially acting coupling arrangment including an axially outwardly directed rim portion about a periphery of the wheel hub punctuated by a plurality of recesses for receiving complementary projections on the accessory for coupling the wheel hub and accessory for rotation in unison. An axially acting coupling arrangement is also provided on the wheel hub for holding the accessory substantially against axial movement relative to the wheel hub.

21 Claims, 16 Drawing Figures

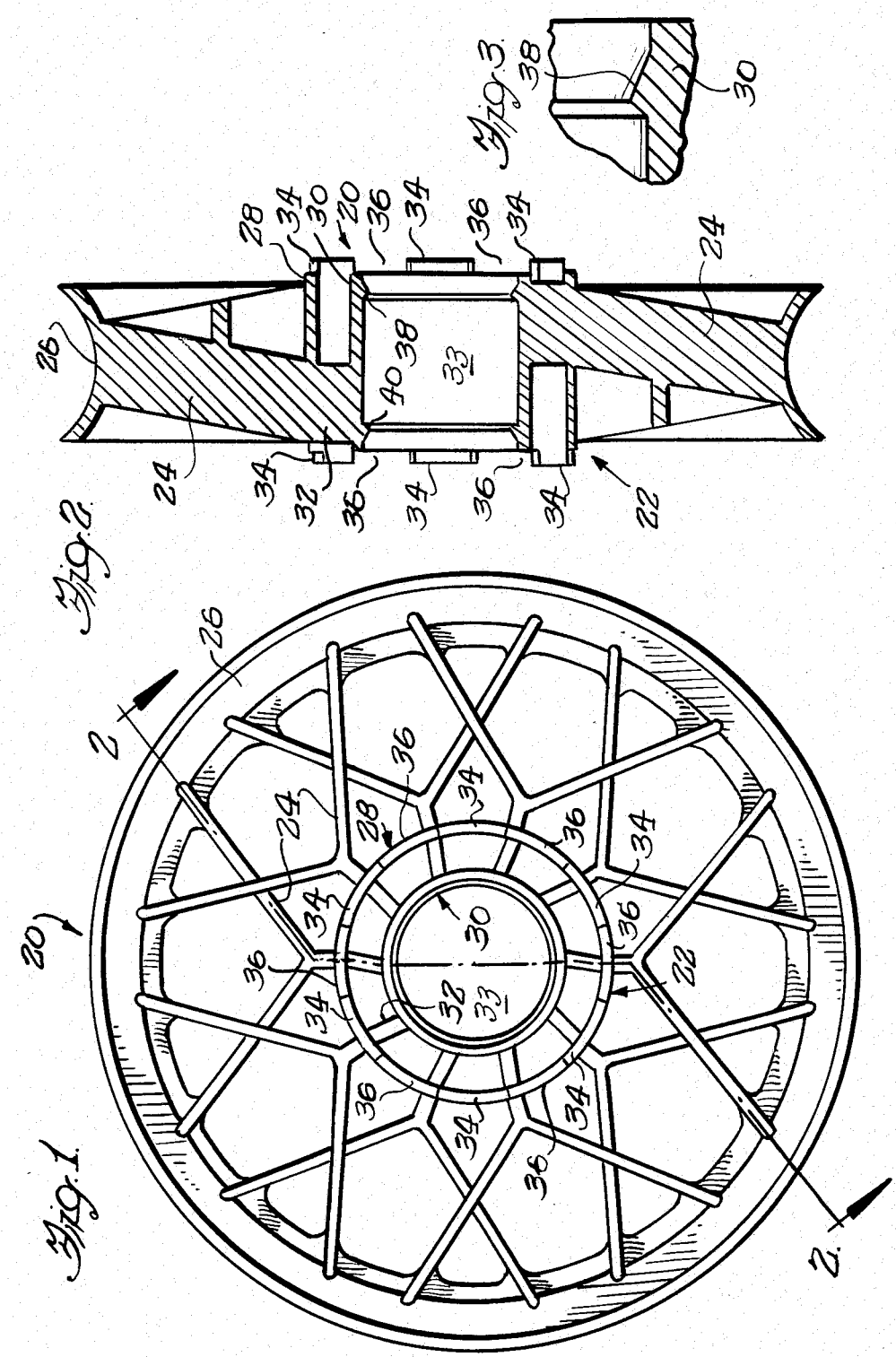

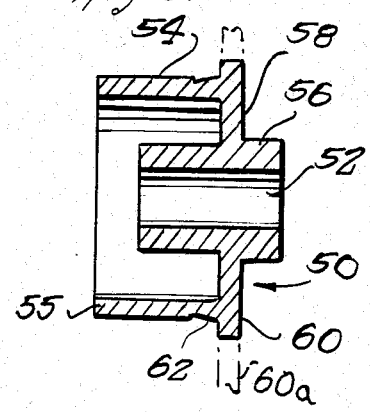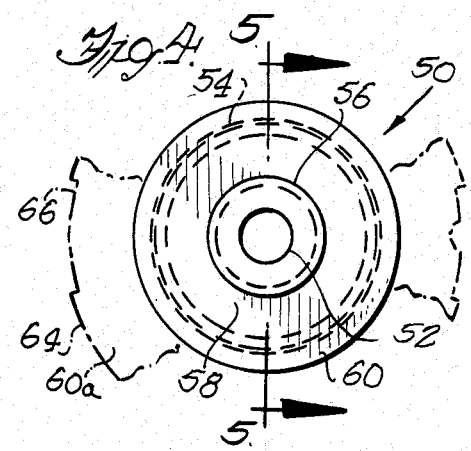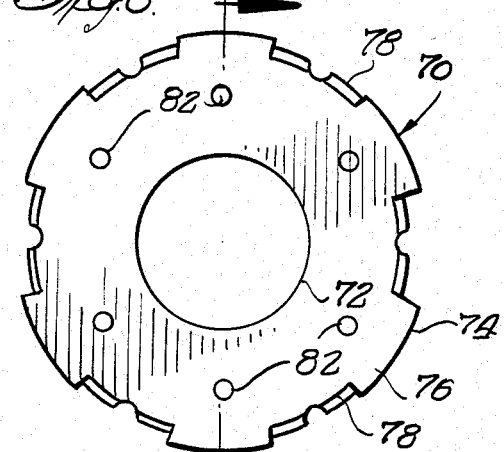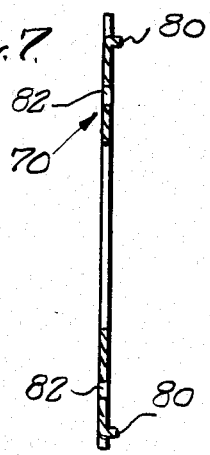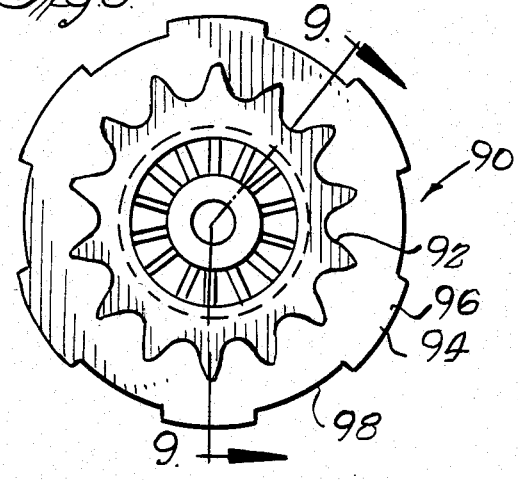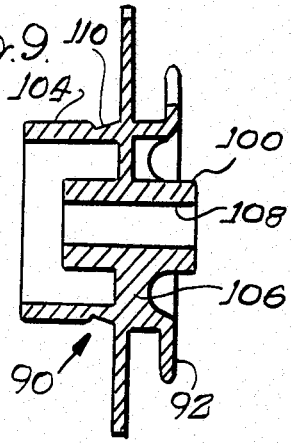

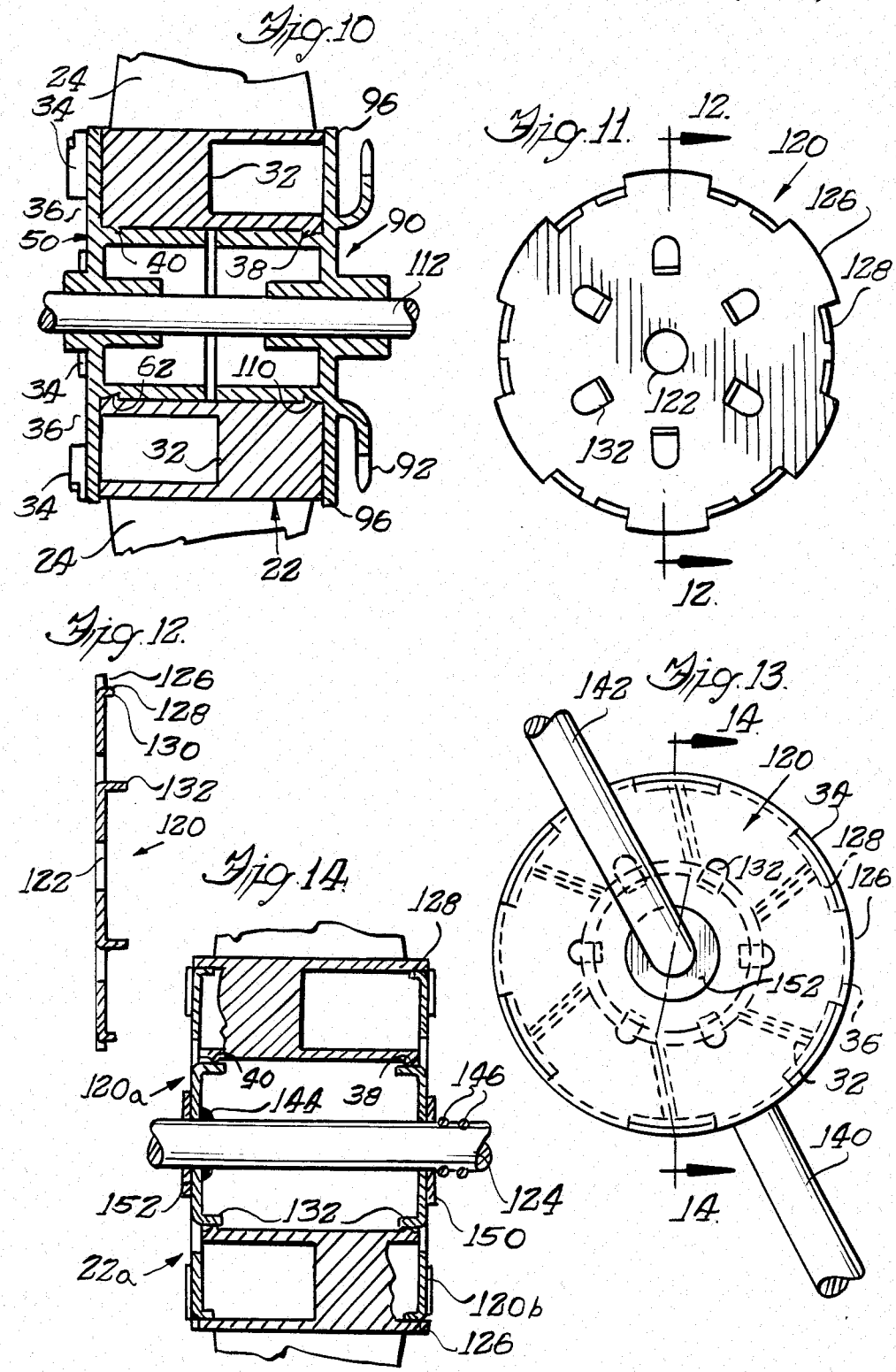

WHEEL HUB INCLUDING STRUCTURE FOR ATTACHMENT OF ACCESSORIES

BACKGROUND OF THE INVENTION

The present invention is directed generally to improvement in a wheel hub and in particular to an improved wheel hub structure for receiving an accessory mounted thereto. Another aspect of the invention is directed to novel cooperating structure provided on both a wheel hub and an accessory to facilitate the mounting of the accessory to the wheel hub.

Wheels for tricycles, bicycles or exercise cycles generally comprise a central hub and a plurality of spokes or other means coupling the hub to a rim for mounting a suitable tire or the like. Heretofore many such wheels have been constructed primarily of metallic materials, requiring that rim, hub and spokes be separately constructed and assembled. To save significantly on the cost of such wheels, various molded plastic one-piece wheels have been proposed. Generally speaking, in such structures hub, spokes and rim are molded in a single molding operation.

However, in the aforementioned applications (bicycles, etc.) various accessories must also be coupled to one or more of the wheels, and in particular to the wheel hubs. In this regard, bicycles or the like require some drive means such as a chain driven sprocket, or alternatively, a braking mechanism such as a coaster brake, both of which are commonly mounted to the wheel hub. Additionally, great savings are realized if the interior hub diameter of all such molded one-piece wheel structures are fixed, and a separate bushing or the like is inserted to accommodate this diameter to a given axle.

From the foregoing it will be seen that the coupling of the desired sprocket, brake or crank to a wheel hub requires some additional parts and assembly. In the case of a one-piece molded wheel structure, the economies realized in provision of the structure may rapidly be lost in the modifications, assembly steps and extra parts required to mount such accessories to the hub.

OBJECTS AND SUMMARY OF THE INVENTION

Accordingly, it is a general object of the present invention to provide an improved molded one-piece wheel structure including means for receiving a plurality of different accessories, without further modification thereto.

A related object is to provide cooperating mounting means on an accessory or accessory mounting structure and on the hub of a wheel for accomplishing mounting of an accessory to the hub without further modification to either.

Briefly, and in accordance with one aspect of the invention, a wheel hub includes an improved structure for mounting at least one accessory thereto comprising radially acting coupling means including an axially outwardly directed rim portion about a periphery of said wheel hub punctuated by a plurality of recesses for receiving complementary peripheral projections on said accessory for coupling said wheel hub and accessory for rotation in unison and axially acting coupling means on said wheel hub for holding said accessory substantially against axial movement relative to said wheel hub.

In accordance with another aspect of the invention a mounting arrangement for mounting at least one accessory having at least one substantially circular portion of a given diameter to a wheel hub having at least one substantially circular portion of a similar diameter, comprises a plurality of spaced apart, axially outwardly extending surfaces about a periphery of said circular hub portion and a plurality of complementary spaced apart slots extending radially inwardly of the periphery of said accessory circular portion for interengaging with the axially outwardly extending surfaces of said hub for holding the hub and accessory for rotation in unison and axially acting coupling means including cooperating means on said hub and said accessory for holding the hub and accessory engaged against relative axial movement.

BRIEF DESCRIPTION OF THE DRAWINGS

The foregoing, as well as other objects, features and advantages of the invention will be more readily appreciated upon reading the following detailed description of the illustrated embodiment, together with reference to the drawings, wherein:

FIG. 1 is a side elevation of an exemplary one-piece molded plastic wheel provided with a hub portion in accordance with one aspect of the invention;

FIG. 2 is a developmental view taken generally along the line 2—2 of FIG. 1;

FIG. 3 is an enlarged view of a portion of FIG. 2;

FIG. 4 is a side elevation of a hub bushing useful with the wheel of FIGS. 1 and 2;

FIG. 5 is a sectional view taken generally along the line 5—5 of FIG. 4;

FIG. 6 is a side elevation of a coaster brake adapter plate which may be used with the wheel of FIGS. 1 and 2;

FIG. 7 is a sectional view taken generally along the line 7—7 of FIG. 6;

FIG. 8 is a side elevation of a sprocket which may be used with the wheel of FIGS. 1 and 2;

FIG. 9 is a developmental view taken along the line 9—9 of FIG. 8;

FIG. 10 is an enlarged view of a central hub portion of the wheel of FIGS. 1 and 2 illustrating the attachment thereto of a sprocket of the type shown in FIGS. 8 and 9 and of a bushing of the type shown in FIGS. 4 and 5;

FIG. 11 is a crank retainer plate which may be utilized with the wheel of FIGS. 1 and 2;

FIG. 12 is a sectional view taken along the line 12—12 of FIG. 11;

FIG. 13 is a side elevation of a crank assembly including a pair of crank adapter plates as shown in FIGS. 11 and 12 assembled with a wheel similar to the wheel of FIGS. 1 and 2;

FIG. 14 is a developmental view taken generally along the line 14—14 of FIG. 13;

DETAILED DESCRIPTION OF THE ILLUSTRATED EMBODIMENT

Figure 15:
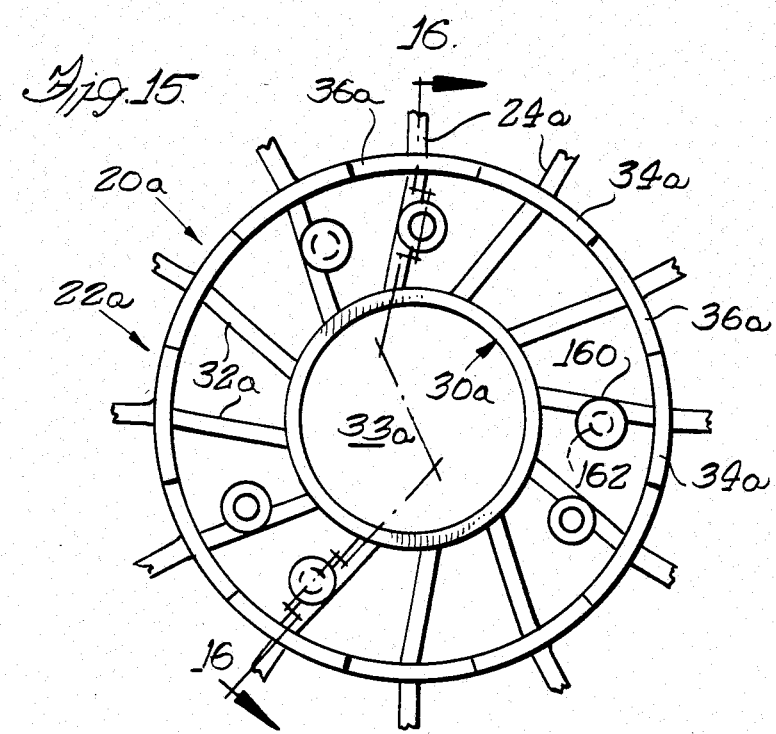
FIG. 15 is a side elevation of a second embodiment of the hub portion of a wheel similar to FIG. 1.

Referring now to the drawings and initially to FIGS. 1 and 2 an exemplary wheel embodying the present invention is designated generally by the reference numeral 20. The wheel 20 is preferably integrally molded of a suitable plastics material. Generally speaking, the wheel 20 includes a central hub portion designated generally by the reference numeral 22 from which radiate a plurality of generally Y-shaped spokes 24. These spokes 24, as best viewed in FIG. 2, radiate from alternate sides of the hub portion 22 about the periphery thereof. The outer peripheral ends of the respective spokes 24 are coupled with a rim 26 which may be shaped to receive a suitable tire, as best viewed in FIG. 2.

In the illustrated embodiment, the central hub portion 22 comprises an outer rim 28 and an inner rim 30. Intermediate these two rims 28 and 30 are a plurality of secondary spokes 32, which like the spokes 24 alternate between front and back sides of the hub 22 and radiate toward respective adjacent ones of the primary spokes 24. The outer rim 28 and the secondary spokes 32 may be eliminated, leaving a single rim 30 from which the primary spokes 24 radiate directly, without departing from the invention.

The inner rim 30 of the hub portion 22 defines a substantially cylindrical through opening 33 for receiving a suitable axle or other components, whereby the wheel 20 may be utilized as a wheel for a bicycle, tricycle, exercise cycle or the like.

In accordance with a feature of the invention, the hub outer rim 28 includes a plurality of radially spaced, axially outwardly extending surfaces or ridges 34. Intermediate the respective ridges 34 are defined a plurality of axially inwardly recessed recesses or slots 36. In accordance with a preferred form of the invention, each of the raised surfaces or ridges 34 and recesses or slots 36 subtends substantially the same degree of arc about the periphery of the hub outer rim 28. Moreover, the ridges 34 and slots 36 are substantially symmetrically formed, and each is the same height or depth throughout its respective arc.

It will be recognized that these alternating ridges and slots 34, 36 may be of any convenient number, size and disposition, without departing from the invention. However, the symmetrical arrangement illustrated is preferred. As will be seen later the recesses 36 receive similar projecting parts on a plate, sprocket wheel or other accessory to be coupled for rotation in unison with the wheel 20 according to the invention. By providing the illustrated and described symmetrical arrangement of these alternating slots and ridges 36, 34, the manufacture of mating components and the assembly thereof is greatly simplified.

In accordance with another feature of the invention, the opening 33 defined by the inner rim 30 includes, near the axial outer extremities thereof, a generally inwardly converging, annular tooth or shoulder portion 38, 40. A cross-sectional view of the inwardly projecting annular shoulder or tooth 38 is best viewed in FIG. 3, to which reference is also invited.

These inwardly converging annular shoulders 38, 40 snappingly engage with mating annular recesses on components to be coupled to the hub. As will be seen later, this coupling holds the accessory against axial movement, discouraging disassembly thereof in the axial direction.

However, the projections 38 and 40 need not take the form illustrated and described herein. For example, any inwardly projecting surface whether a continuous annular surface or a plurality of independent projections may be considered an equivalent structure and hence falls within the scope of the invention. The preferred form illustrated is believed simpler to form in a molding process. Moreover, this preferred form facilitates the manufacture of a mating accessory and its assembly therewith.

Having thus described a preferred embodiment of a molded wheel in accordance with the invention, a number of exemplary mating components or accessories and their assembly therewith will now be described.

Referring initially to FIG. 4 and FIG. 5, a bushing 50 suitable for use in adapting the hub 22 to receive a shaft or axle therethrough is illustrated. This bushing 50 defines an inner diameter 52 for receiving a shaft or axle therethrough and an outer diameter 54 substantially similar to the inner diameter of the inner hub portion or rim 30. As best seen in FIG. 5, the inner diameter 52 is defined by a first or inner tubular portion 56 while the outer diameter 54 is defined by a second or outer tubular portion 55 of the bushing 50. A generally annular web member or portion 58 joins the inner and outer tubular portions 55, 56 of the bushing 50.

Additionally, this annular web portion 58 extends radially outwardly to define flange portion 60. This flange portion 60 is of somewhat greater diameter than the outer diameter of the inner rim 30 of the hub 22. Immediately axially inwardly of this flange portion 60 is an annular recess or groove 62 which is substantially complementary with the annular projections 38, 40 of the hub 22. Accordingly, as will be seen later, the bushing 50 may be easily engaged with the hub 22 by axially advancing the bushing until the complementary annular parts 62 and 38 or 40, respectively, interengage. In accordance with an alternate embodiment, as shown in phantom line in FIG. 4 and FIG. 5, the flange portion 60 may extend radially outwardly at 60a to terminate in a plurality of radially outwardly extending ridges 64 and alternating recesses 66 for interengagement with the ridges and recesses 34, 36 of the hub outer rim portion 28.

Referring now to FIG. 6 and FIG. 7, a coaster brake adapter plate is indicated generally by the reference numeral 70. This coaster brake adapter plate preferably comprises a metallic plate member having a generally circular through opening 72 and an outer periphery 74 of similar diameter to the outer diameter of the hub outer rim portion 28. Cooperatively, this outer rim portion 74 defines a complementary plurality of alternating radially outwardly projecting parts 76 and recesses 78 for interengagement with the projections and recesses 34, 36 of the hub outer rim portion 28.

In the illustrated embodiment, each of the recessed portions 78 of the adapter plate 70 is also provided with an axially inwardly projecting or bent-over portion 80. Preferably, these portions 80 define a diameter substantially similar to the inner diameter of the rim 28 for frictional engagement therewith. In the illustrated embodiment, the adapter plate 70 also includes a plurality of mounting apertures 82 therethrough for receiving suitable fasteners or the like for engagement with mating bores, as will be seen later with reference to FIGS. 15 and 16 of the wheel hub 22. In this regard, one such adapter plate 70 is preferably utilized at either axial end of the hub 22 and held against disengagement in the axial direction by either a frictional fit as described or by suitable fasteners through the respective openings 82.

Referring next to FIG. 8 and FIG. 9, a sprocket wheel, preferably of a suitable plastics material is indicated generally by the reference numeral 90. This sprocket wheel 90 includes a conventional sprocket portion 92 for engagement with a chain drive or the like. This sprocket portion 92 projects somewhat axially outwardly of an integrally formed circular plate portion 94. Cooperatively, the circular plate 94 is formed with a plurality of alternating radially outwardly projecting parts 96 and inwardly recessed parts 98 for interengagement with the projections and recesses 34, 36 of the hub outer rim portion 28.

Additionally, the sprocket wheel member 90 includes an inner tubular portion 100 and an outer tubular portion 104 joined by a suitable annular web portion 106. This latter structure is all substantially similar to that shown and described with reference to the bushing 50 of FIG. 4 and FIG. 5. Accordingly, the inner tubular portion 100 defines a substantially similar inner diameter 108 to the inner diameter 52 of a bushing to be associated with the same wheel 20, as shown for example in FIG. 10.

Additionally, the outer tubular portion 104 includes an annular recessed portion or groove 110 which is complementary with the inwardly projecting annular parts 38, 40 of the hub 22. Accordingly, as best viewed in FIG. 10 a typical sprocket assembly including a sprocket member 90 and a bushing member 50 may readily be assembled to the opposing faces of the hub 22 and a suitable shaft or axle 112 mounted therethrough.

Referring next to FIGS. 11 through 14, inclusive, a crank adapter plate, indicated generally by the reference numeral 120, and its mounting with a typical crank assembly to a wheel hub 22a, substantially similar to the wheel hub 22 of FIGS. 1 and 2, is illustrated. The crank adapter plate 120 is substantially similar to the coaster brake adapter plate 70 of FIG. 6 and FIG. 7. However, a central through aperture 122 thereof is of similar diameter to the outer diameter of a crank shaft 124 (see FIG. 14) to be received therethrough. The crank adapter plate 120 is provided with similar peripheral radially outwardly projecting and inwardly recessed parts 126, 128 for engagement with the projections and recesses 34, 36 of the hub outer rim portion 28. Additionally, the inwardly recessed portions 128 are provided with axially projecting parts 130 for frictional engagement with the inner diameter of the rim 28.

In accordance with the embodiment illustrated in FIGS. 11 through 14, the crank adapter plate 120 is also provided with a plurality of axially inwardly projecting cut-out portions 132 which define a diameter substantially similar to the inner diameter of the hub inner rim portion 30. Hence, these projections 132 preferably frictionally engage the inner surface of the rim 30 as best seen in FIG. 14.

As viewed in FIG. 13 and FIG. 14, a typical crank assembly includes the crank shaft 124 which is preferably bent at substantially 90° at axially outermost ends thereof to form a pair of radially outwardly extending cranks 140, 142. Suitable cranks 140, 142 may also be provided as separate parts for attachment by suitable means to the axially outer ends of the crank shaft 124.

The crank shaft 124 is preferably preassembled with one crank adapter plate member 120a by a suitable weldment 144 at an inner face thereof to which the plate 120a is assembled as indicated in FIG. 14. Thereupon a second, similar crank adapter plate 120b, is engaged over the axially opposite end of the crank shaft 124 and coupled in the same fashion with the hub 22a. Suitable weldments 146 or other means are utilized to axially engage this remaining end of crank shaft 124 with the plate 120b. In the illustrated embodiment suitable washers 150, 152 are interposed about either outer face of the respective plates 120a, 120b to enhance the rigidity and structural integrity of the assembly illustrated in FIG. 14.

Reference is next invited to FIG. 15 which illustrates an alternate embodiment of the central hub portion 22a of a wheel 20a which is similar to the wheel 20 of FIGS. 1 and 2. In this regard, corresponding parts of the wheel hub 22a have been indicated by the same reference numerals used in FIG. 1 and FIG. 2, followed by the suffix a. However, the central hub portion 22a of FIG. 15 includes twelve inner spokes 32a and hence twelve corresponding outer spokes 24a. Similarly, the raised and lowered rim portions 34a and 36a are each six in number. In all other respects, this wheel 20a and central hub portion 22a are substantially identical to the wheel 20 shown in FIGS. 1 and 2.

Figure 16:
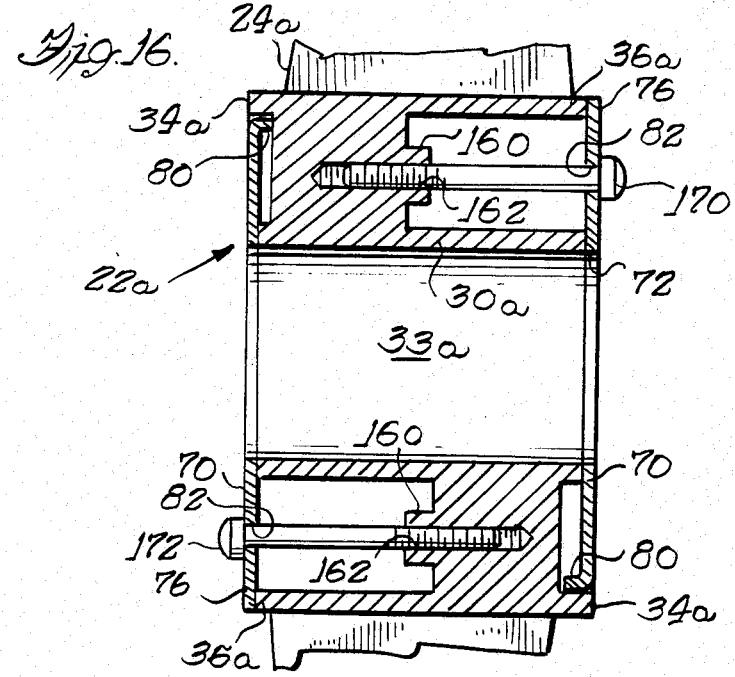
FIG. 16 is a developmental view taken generally along the line 15—15 of FIG. 15 and further illustrating a pair of adapter plates of the type shown in FIGS. 6 and 7 mounted to the wheel hub of FIG. 15.

However, and referring also to FIG. 16, the wheel hub 22a includes additional structure for facilitating the mounting of coaster brake adapter plates of the type illustrated in FIG. 6 and FIG. 7 thereto. In this regard, selected ones of the inner spokes 32a are further provided with integrally molded bosses 160 which carry bores 162 therein for receiving a suitable fastener, for example a threaded screw-type fastener.

In the embodiment illustrated in FIG. 15 and FIG. 16, three of the bosses 160 are arranged with the bores 162 facing one side of the hub 22a and in a symmetrical fashion about the circumference thereof. Three similar bosses 160 are symmetrically arranged about the circumference of the hub 22a with their bores 162 facing in the opposite direction.

Cooperatively, as will be seen with reference again to FIG. 6, the placement of the through apertures 82 in the plates 70 and of these bosses 160 facilitate alignment of three of the through apertures 82 with the three facing bores 162 carried in the bosses 160, without regard for which side of the hub 22a the plate 70 of FIGS. 6 and 7 is placed. That is, when the radially outwardly extending portions 76 of the plate 70 are interfitted with the recessed rim portions 34a of the hub 22a, three of the apertures 82 will automatically be aligned with the bores 162 of the three bosses 160 facing that side of the hub 22a. Hence, as illustrated in FIG. 16, suitable fasteners such as threaded screws 170 and 172 may readily be passed through the apertures 82 for threaded engagement with the bores 162. As viewed in FIG. 16, the alignment of the respective apertures 82 and bores 162 is seen to occur with respect to plates 70 placed at both sides of the hub 22a.

Other numbers or arrangements of these bosses 160 and the corresponding through apertures 82 of the plate 70 may of course be utilized without departing from the invention.

While the invention has been illustrated and described herein with reference to preferred embodiments, the invention is not limited thereto. Those skilled in the art may devise various changes, alternatives, and modifications upon reading the foregoing descriptions. The invention includes such changes, alternatives and modifications insofar as they fall within the spirit and scope of the appended claims.

The invention is claimed as follows:

1. A one-piece integrally formed wheel hub including an improved structure integrally formed therewith for mounting at least one accessory having a portion of given outer diameter thereto, said improved structure comprising: radially acting coupling means including a plurality of axially directed alternating recesses and ridges about a periphery of said wheel hub for receiving complementary slots and projections on said accessory for coupling said wheel hub and said accessory for rotation in unison and axially acting coupling means on said wheel hub for holding said accessory substantially against axial movement relative to said wheel hub.

2. Apparatus according to claim 1 wherein said ridges comprise a plurality of substantially evenly radially spaced axially outwardly extending surfaces formed in an axially outer, peripheral surface of a substantially cylindrical wheel hub portion and defining said recesses therebetween.

3. Apparatus according to claim 2 wherein each of said recesses and ridges describes a substantially equal arc about the periphery of said substantially cylindrical hub portion.

4. Apparatus according to claim 1 wherein said axially acting coupling means comprises an interior rim portion of a given inner diameter in said wheel hub for engaging said accessory portion of given outer diameter in a friction fit.

5. Apparatus according to claim 1 wherein said axially acting coupling means comprises an interior rim portion in said wheel hub having an inner diameter similar to the given outer diameter of said portion of the accessory and axially inwardly extending shoulder means on said interior rim portion for snappingly engaging over a further predetermined portion of said accessory.

6. Apparatus according to claim 5 wherein said axially inwardly extending shoulder means comprises a substantially annular shoulder extending about the entire inner circumference of said interior rim portion of said hub.

7. Apparatus according to claim 1 or claim 4 or claim 6 wherein said hub defines a pair of concentric, cylindrical rim members, and wherein the axially acting coupling means is formed on one of said concentric rim members and the radially acting coupling means is formed on the other of said concentric rim members.

8. Apparatus according to claim 7 wherein said axially acting coupling means is formed on the innermost of said concentric rim members and the radially acting coupling means is formed on the axially outermost of said concentric rim members.

9. Apparatus according to claim 1 or claim 4 or claim 6 wherein said axially acting coupling means further comprises a plurality of internally threaded boss means integrally formed with said hub.

10. An arrangement for mounting at least one accessory having at least one substantially circular portion of a given diameter to a wheel hub having at least one substantially circular portion of a similar diameter, comprising: a plurality of spaced apart, axially outwardly extending surfaces integrally formed about a periphery of said circular hub portion; a plurality of complementary spaced apart slots extending radially inwardly of the periphery of said accessory circular portion for interengaging with the axially outwardly extending surfaces of said hub for holding the hub and accessory for rotation in unison; and axially acting coupling means including cooperating means on said accessory and integrally formed on said hub for holding the hub and accessory engaged against relative axial movement.

11. Apparatus according to claim 1 or claim 10 wherein said hub is formed from a plastics material.

12. Apparatus according to claim 11 wherein said accessory is formed from a plastics material.

13. Apparatus according to claim 11 wherein said accessory is formed from a metallic material.

14. Apparatus according to claim 10 wherein said axially acting holding means comprises an interior rim portion in said wheel hub having an inner diameter similar to the outer diameter of said accessory and axially inwardly extending shoulder means on said interior rim portion for snappingly engaging over a predetermined portion of said accessory.

15. Apparatus according to claim 14 wherein said axially inwardly extending shoulder means comprises a substantially annular shoulder extending about the entire inner circumference of said interior rim portion of said hub.

16. Apparatus according to claim 14 or claim 15 wherein said accessory includes a complementary axially inwardly extending portion having a circumferential groove for engagement with said axially inwardly extending shoulder means.

17. Apparatus according to claim 10 or claim 14 wherein said axially acting coupling means further comprises a plurality of internally threaded boss means integrally formed with said hub.

18. Apparatus according to claim 10 wherein said spaced apart axially outwardly extending surfaces are substantially evenly radially spaced and are formed in an axially outer, peripheral surface of a substantially cylindrical wheel hub portion and define recesses therebetween.

19. Apparatus according to claim 18 wherein each of said recesses and surfaces describes a substantially equal arc about the periphery of said substantially cylindrical hub portion.

20. Apparatus according to claim 10 wherein said axially acting coupling means comprises and interior rim portion of a given inner diameter in said wheel hub and wherein said accessory has a peripheral rim portion of substantially similar outer diameter for engaging said hub rim portion in a friction fit.

21. A one-piece integrally formed wheel hub including an improved structure integrally formed therewith for mounting at least one accessory thereto said improved structure comprising: radially acting coupling means including an axially outwardly directed rim portion about a periphery of said wheel hub punctuated by a plurality of recesses for receiving complementary peripheral projections on said accessory for coupling said wheel hub and said accessory for rotation in unison and axially acting coupling means on said wheel hub for holding said accessory substantially against axial movement relative to said wheel hub.

* * * * *